United States Patent [19]

Clausen

[11] Patent Number: 4,816,952
[45] Date of Patent: Mar. 28, 1989

[54] CLEANING APPARATUS FOR A TAPE DRIVE MACHINE

[75] Inventor: Eivind Clausen, Bellingham, Wash.

[73] Assignee: Allsop, Inc., Bellingham, Wash.

[21] Appl. No.: 818,120

[22] Filed: Jan. 10, 1986

[51] Int. Cl.[4] .............................................. G11B 5/41
[52] U.S. Cl. .............................. 360/128; 15/DIG. 12; 360/137
[58] Field of Search ............................ 360/128, 137; 15/DIG. 12, 210 R; 242/192

[56] References Cited

U.S. PATENT DOCUMENTS

| | | | |
|---|---|---|---|
| 3,783,470 | 1/1974 | Myers et al. | 15/210 R |
| 3,976,262 | 8/1976 | Kennedy | 242/192 |
| 4,225,893 | 9/1980 | Loiselle | 360/137 X |
| 4,442,468 | 4/1984 | d'Alayes de Costemore d'Arc | 360/137 X |
| 4,454,551 | 6/1984 | Clausen et al. | 360/137 |
| 4,594,629 | 6/1986 | d'Alayer de Costemore d'Arc | 360/128 |

FOREIGN PATENT DOCUMENTS

| | | | |
|---|---|---|---|
| 0100254 | 6/1983 | Japan | 360/128 |
| 2090226 | 7/1982 | United Kingdom | 360/60 |
| 8404840 | 12/1984 | World Int. Prop. O. | 360/128 |

Primary Examiner—Stuart N. Hecker
Assistant Examiner—David J. Severin
Attorney, Agent, or Firm—Hughes, Cassidy & Multer

[57] ABSTRACT

A cleaning cassette for a tape drive machine wherein a capstan of the machine drives a cleaning portion of the cassette across the magnetic head of the machine. The cassette includes a carriage having two ends which extends across the cassette in the length direction, which is pivotally mounted on one end, and which includes a slot around the pivot pin to allow back and fourth motion across the head. The other end of the carriage holds the cleaning portion and is allowed to move toward and away from the head by virtue of the pivotal mounting. A drive gear system in the cassette moves the carriage across the head.

15 Claims, 5 Drawing Sheets

FIG. I

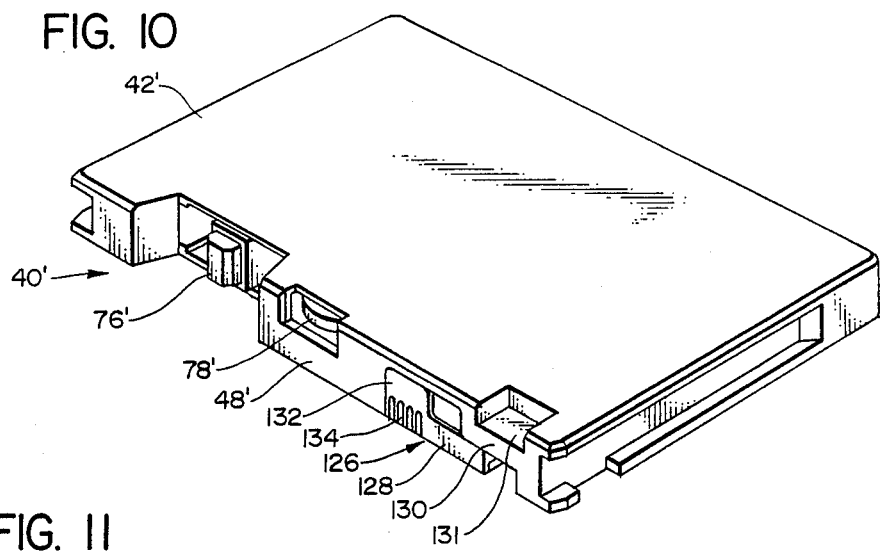
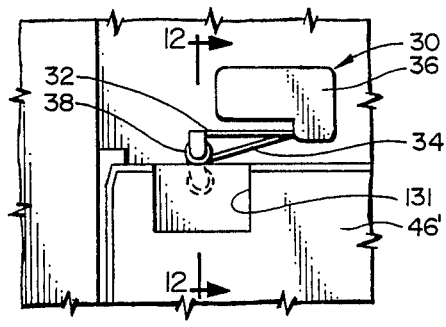
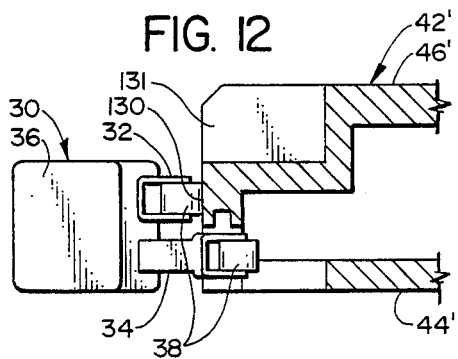

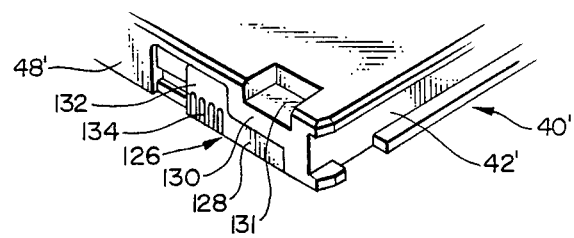
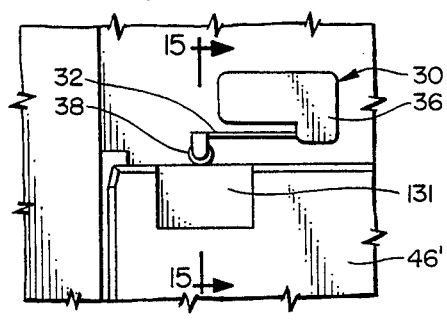
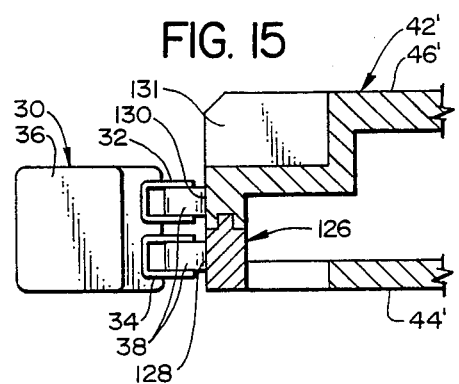

CLEANING APPARATUS FOR A TAPE DRIVE MACHINE

BACKGROUND OF THE INVENTION

1. Field of the Invention

The present invention relates to an apparatus and method for cleaning a read and/or write head of a machine, such as a tape drive, which is adapted to operate on a tape cassette containing a magnetic tape, and more particularly to such an apparatus and method which is particularly adapted to clean such a head where the head has irregularities on its operating surface.

2. Background Art

There are various machines which operate to receive information from, or impart information to, magnetic tape. Two such commonly used machines are video player/recorder units and audio player/recorder units. In the video units, the magnetic tape is pulled outwardly from a cassette tape cartridge and brought into engagement with a shallow cylindrical surface of a rotating element on which the player/recorder head is carried. In the audio unit, the magnetic tape generally extends across a forward portion of the tape cassette, with the tape being exposed at this forward portion. The tape passes by a stationary player/recorder head, and is also engaged by a capstan and pinch roller of the machine to cause the tape to move along its length.

Various cleaning devices have been proposed to clean the operating surfaces of such player/recorder units. With the video unit, it has been a common practice to provide a cleaning ribbon which is engaged by guide elements in the video player/recorder unit to carry the cleaning ribbon into engagement with the rotating element carrying the playing/recording head and possibly into engagement with other components of the video player/recorder unit.

Another type of cleaning mechanism which is used more commonly with audio player/recorder units comprises a cassette housing which carries a cleaning member which in turn is adapted to carry a cleaning element, such as a pad. This cleaning member is arranged to move on a cleaning path, which in many cleaning devices is a back and forth path where it wipes against the playing/recording head of the audio unit. Quite commonly, the cleaning member is driven on its back and forth path through a suitable drive transmission from one of the drive spindles in the audio player/recorder unit.

To obtain the proper cleaning action, it is desirable to have adequate frictional engagement between the cleaning pad and the surface of the player/recorder head of the audio unit. However, if the force of the frictional engagement is excessive, then the resistance imparted back through the drive transmission to the drive sprocket may trigger the automatic shutoff mechanism in the machine.

Another concern is that the operating surface of the player/recorder head is quite often not a flat surface, but a moderately curved surface. Also, in some instances, the operating surface of the head may be a compound curved surface, having two side curved portions, with a moderate recess between the two curves. This may have a tendency to create a resisting force against the cleaning pad greater than what would normally be encountered simply from frictional engagement.

Another consideration is that the location of the player/recorder head will vary from machine to machine. Thus, the cleaning element (i.e. usually the cleaning pad) must be mounted in such a way that it can be positioned at different forward to rear locations and still be in proper cleaning engagement with the player/recorder head.

One common means of mounting the cleaning element is to place it on an arm which is pivotally mounted for back and forth motion about a pivot location located in the center portion of the cassette housing. To accommodate different forward to rear locations of the cleaning element, there is sometimes provided a string arm, which in one form can be a U-shaped spring section, such as shown in U.S. Pat. No. 4,225,893—Loiselle. This same patent shows another method of accommodating this difference in forward to rear location of the cleaning element is to mount the forward to rear lever arm itself by means of a pin and slot connection so that it can be positioned at different forward to rear locations as the pivot arm swings back and forth about the pivot location to accomplish the cleaning motion.

With regard to the problem of the cleaning element being "caught" or "snagged" on the surface of the playing/recording head (e.g. possibly being engaged by a side surface portion of the head so as to create a relatively large resistance to the back and forth movement of the cleaning element), one approach to this problem, as shown in U.S. Pat. No. 4,454,551—Clausen et al, is to provide the arm which carries the cleaning pad with a spring having a somewhat "Z" configuration, where the spring has two oppositely positioned U-shaped spring sections.

In yet other instances, the cleaning element is mounted to a carrier which, instead of a pivot motion, has a linear side to side motion, with the carrier or carriage for the cleaning pad having a laterally extending member mounted between pins. An example of this is shown in U.S. Pat. No. 4,442,468—d'Alayer de Costemore d'Arc.

In addition to video and audio playing/recording units, there are also tape drives which move a magnetic tape relative to a read/write head so that data can be taken from the tape or transmitted to the tape. In one such tape drive, which is sold by Hewlett Packard as the HP 9144A Tape Drive, there is provided a read/write head which is positioned at a front side location relative to the tape cassette, and the operating surface of this head has a pair of vertically oriented ridges which protrude outwardly from the operating surface a short distance. With regard to cleaning such a read/write head, for example by a back and forth motion of a pad, these ridges aggravate the problem of the cleaning pad encountering an excessive resisting force by the pad coming into engagement with the side surfaces of these ridges.

In this tape drive machine, there is a drive wheel (i.e. a capstan) which engages a drive element in the tape cassette to cause rotation of the tape. The operation of the machine is such that the motion imparted to the tape is a somewhat erratic back and forth motion.

SUMMARY OF THE INVENTION

The apparatus of the present invention is arranged to perform a cleaning operation on a machine which receives data from and/or imparts data to a magnetic tape, where the machine comprises:

a. a structure defining an operating location to receive a tape cassette, said operating location having a front area, a rear area and first and second side areas;

b. a read and/or write head located at the front area adjacent said first side area, with the head having a rearwardly facing operating surface, positioned to operatively engage a magnetic tape in the tape cassette;

c. a drive system to engage a drive element in the tape cassette to move the magnetic tape by the head.

The apparatus comprises a housing having a configuration to fit within the operating location in an operating position. The housing has a forward portion, a rear portion, first and second side portions, a center portion, and a longitudinal center axis extending from the front portion, to the center portion to the rear portion. There is a carriage positioned in the housing and having first and second end portions adjacent the first and second side portions of the housing, respectively. The second end portion is pivotally mounted to mounting means at a mounting location at the second side portion in the housing for pivot motion about the mounting location and also for back and forth motion in the housing relative to the mounting location along a lateral path having a substantial alignment component perpendicular to a longitudinal center axis.

The carriage has at its first end portion a cleaning portion at a cleaning location. The cleaning portion is adapted to carry a cleaning member, and with the housing in the operating position, the cleaning portion is adjacent to the head of the machine. The cleaning portion is positioned, relative to the mounting location, for limited movement along a forward and rearward path about the mounting location as a pivot location, with the carriage acting as a lever arm extending from the mounting location transversely across the longitudinal center axis to the cleaning location.

The apparatus has drive means positioned to operatively engage the drive system so as to be driven thereby, to move the carriage from side to side along the lateral path, in a manner that the cleaning portion moves along a substantially linear side to side cleaning path relative to the head. This is accomplished in a manner that with the housing in the operating position, the cleaning portion, being movable along said forward and rearward path, is able to be in proper engagement with the head, as it moves back and forth across the head when in cleaning engagement therewith.

In the preferred form, the drive means comprises first drive element means mounted for rotation at the center portion of the housing, and second drive element means operatively connected between the first drive element means and the carriage to translate rotational movement of the first drive element means to back and forth motion that is imparted to the carriage. More specifically, the first drive element means comprises a cam member having a cam surface, with the cam member being mounted eccentrically for rotation relative to the cam surface, and the second drive element comprises a cam follower operatively engaging said cam surface.

Specifically, the drive means comprises a first drive wheel positioned at the forward portion of the housing to engage the drive system of the machine, with the drive wheel being in turn connected to a speed reducing gear transmission. There is a cam member mounted eccentrically to the speed reducing gear transmission, and the carriage has a cam follower means engaging the cam in a manner that rotational movement of the cam causes reciprocating movement of the carriage. In the preferred form, this speed reducing gear transmission comprises at least a first gear operatively connected to the drive wheel and a second larger gear operatively connected to the cam member.

Also in the preferred form, the mounting means comprises a pin and slot mounting means, where one of the carriage and said housing has a pivot pin, and the other of the carriage and housing has an elongate horizontal slot engaging the pin. In the specific embodiment shown herein, the carriage is formed with the laterally extending slot, and the pin is mounted to the housing.

Also, in the preferred configuration, the pivot pin is mounted, relative to the cleaning member, at a forward location adjacent to the second side portion of the housing so that forward to rear movement of the cleaning member about the mounting location is substantially perpendicular to the operating surface of the read and/or write head.

Further, in a preferred form, there is spring means operatively engaging the cleaning portion of the carriage to urge the first end portion of the carriage forwardly so as to place the cleaning portion in operative cleaning engagement with the head.

In accordance with another feature of the present invention, the apparatus is arranged to operate where the machine has contact switch means positioned to engage contact members of a magnetic tape cassette so as to be located in selected switch positions relating to the operation of the machine. The apparatus comprises a selectively operable switch locating device, with the switch locating device being movable between at least first and second positions to locate the switch means of the machine selectively at at least two selected positions. More specifically, the switch means comprises at least first and second switch elements, and the switch locating device comprises first and second contact surface means which are arranged for selective engagement with at least one of said switch elements.

In one configuration, the switch locating device comprises a plurality of contact surfaces, with the locating device being rotatably mounted so as to place selectively the contact surfaces into selective contact with the switch elements.

In another configuration, the locating device is mounted for linear motion relative to the housing, and has at least one contact surface which is movable with the locating device to a contact location with at least one of the switch elements, and also movable to a non-contact location.

In the method of the present invention, an apparatus is provided as described above. The carriage is then driven on its lateral back and forth path, with the pivot mounting of the carriage permitting forward to rear tolerance of the cleaning member.

Other features of the present invention will become apparent from the following detailed description.

BRIEF DESCRIPTION OF THE DRAWING

FIG. 10 is an isometric view of a second embodiment of the apparatus of the present invention, illustrating a modified switch locating apparatus;

FIG. 11 is a top plan view of the forward left portion of the cleaning cartridge of FIG. 10, showing the switch locating apparatus engaging the switches of the tape drive in one operating position;

FIG. 12 is a sectional view taken along line 12—12 of FIG. 11;

FIG. 13 is an isometric view showing a forward left hand side portion of the cleaning apparatus of FIG. 10, showing the disc locating apparatus in a second position;

FIG. 14 is a view similar to FIG. 11, showing the switches in a second position; and FIG. 15 is a sectional view taken along line 15—15 of FIG. 14.

DESCRIPTION OF THE PREFERRED EMBODIMENTS

Figure 1:
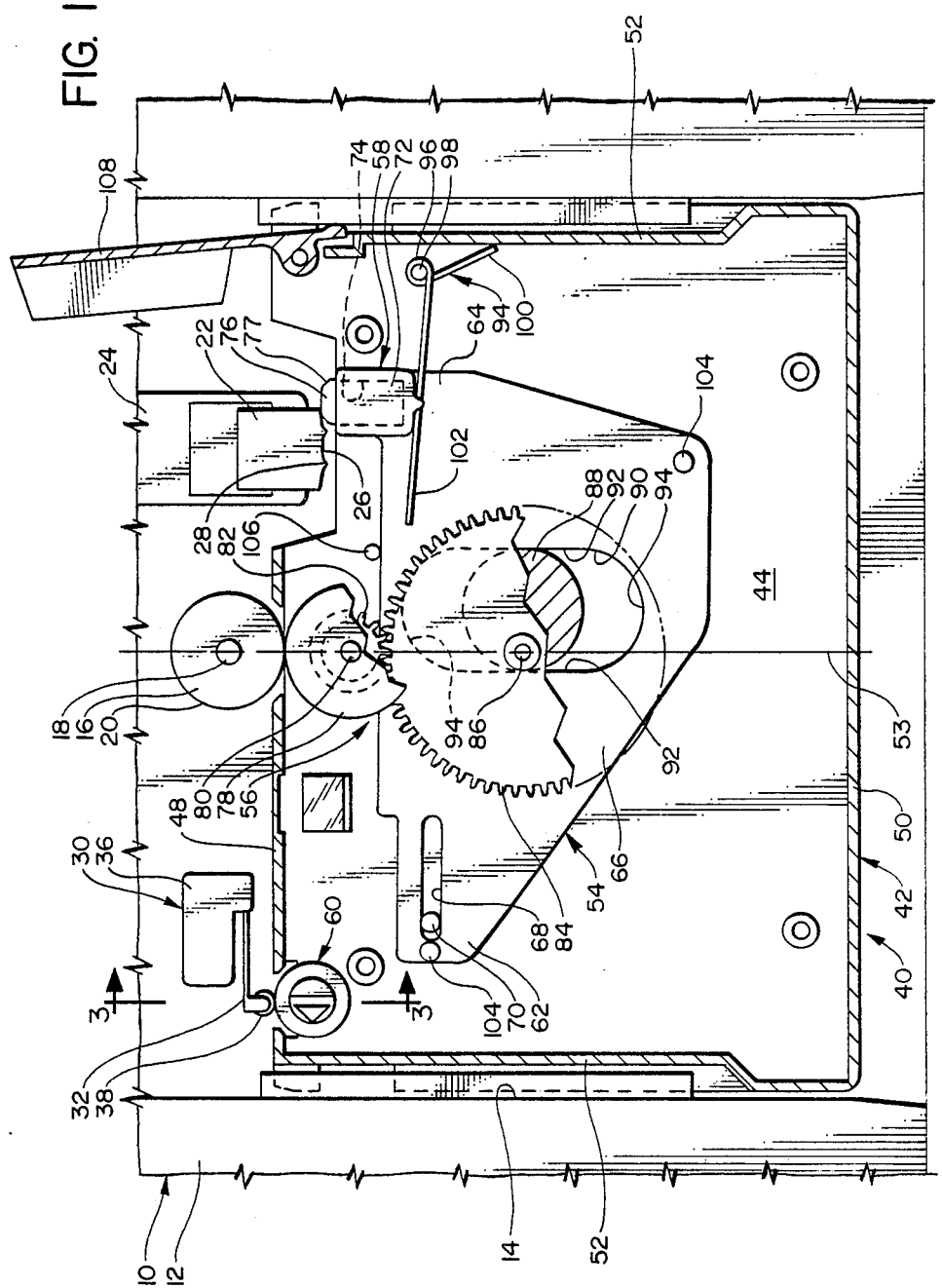
FIG. 1 is a top elevational view of a portion of a prior art tape drive unit, with a cleaning apparatus of the present invention mounted in its operating position in the tape drive unit, and with the carriage of the cleaning apparatus being shown at its far right position.
Figure 2:
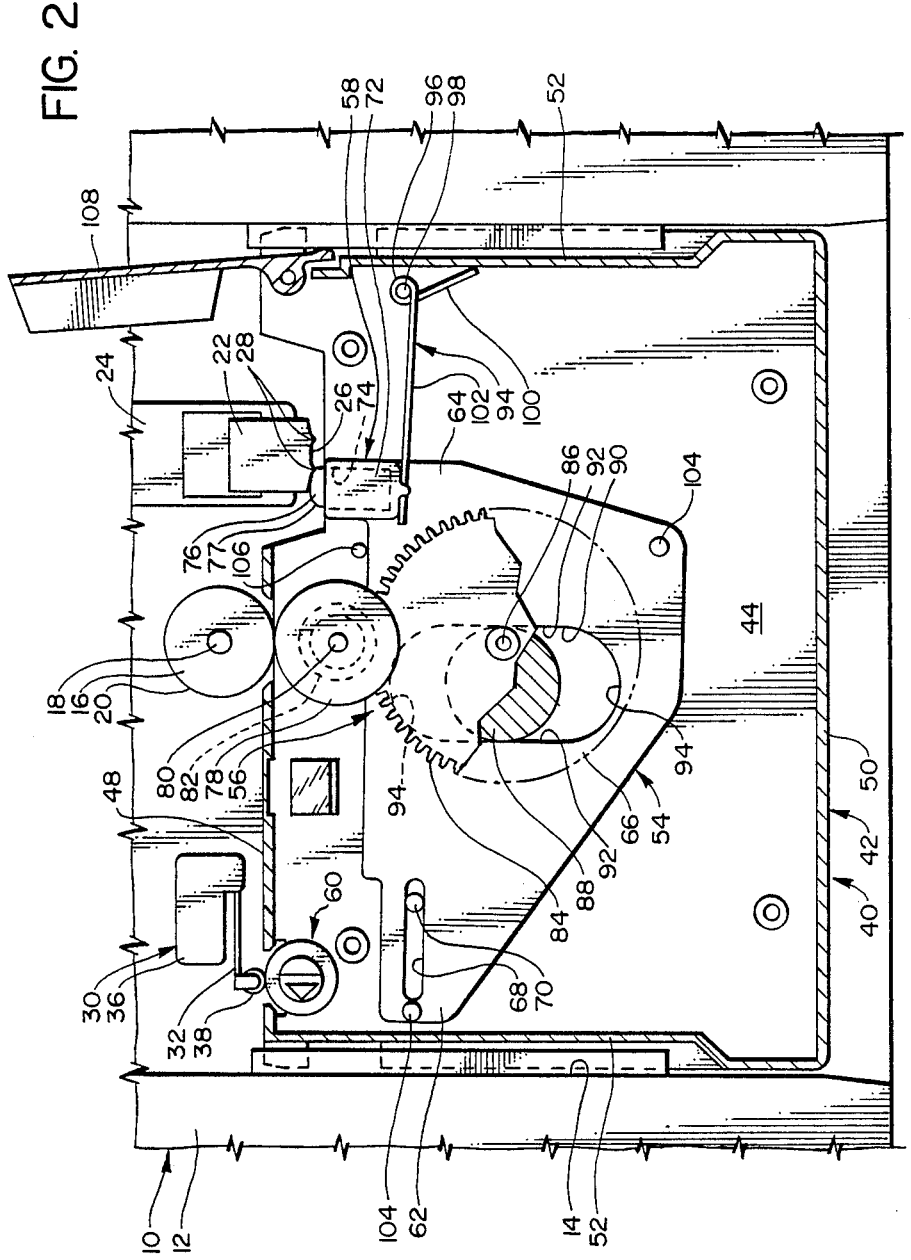
FIG. 2 is a view similar to FIG. 1, but showing the carriage at its extreme left hand position.
Figure 3:
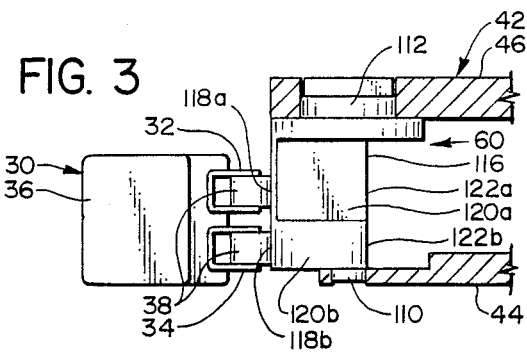
FIG. 3 is a sectional view taken along line 3—3 of FIG. 1, and showing a switch positioning member of the present invention in one operating position.
Figure 4:
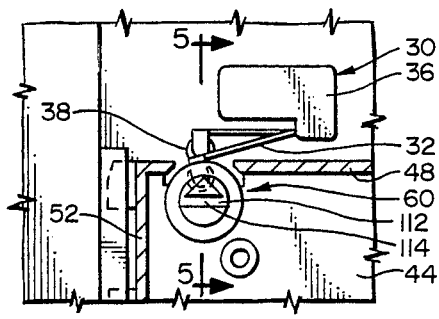
FIGS. 4, 6 and 8 are top plan views of the forward left position of the cleaning apparatus of the present invention, showing the switch positioning member illustrated in FIG. 3 in three other operating positions, respectively.
Figure 5:
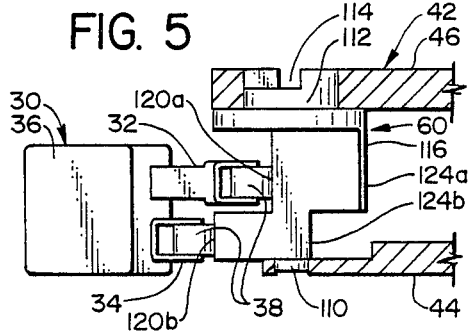
FIGS. 5, 7 and 9 are sectional views similar to FIG. 3 and taken along, respectively, lines 5—5, 7—7 and 9—9 of FIGS. 4, 6 and 8, respectively.
Figure 6:
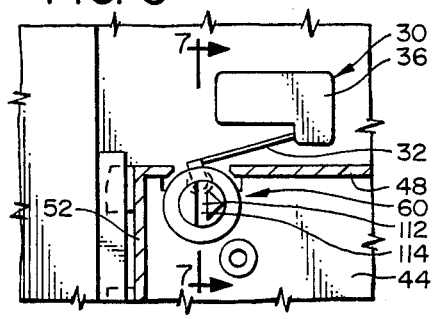
Figure 7:
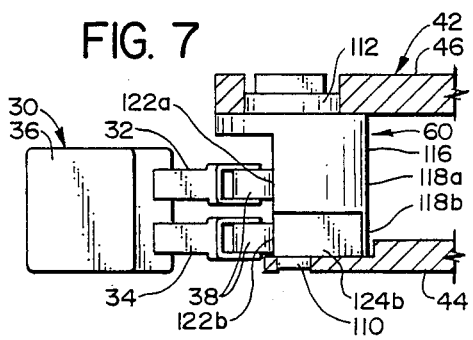

In FIGS. 1 and 2, there is shown a portion of a tape drive unit 10, such as the tape drive unit mentioned previously herein, produced by Hewlett Packard. Only those components of the unit 10 are shown which are directly relevant to the operation of the present invention.

The tape drive unit 10 comprises a containing structure (a portion of which is shown at 12) which defines a generally rectangular containing area 14 and which in the normal operation of the unit 10 contains a prior art tape cassette, having a particular configuration to operate in this unit 10. The unit 10 has a tape drive system which comprises a drive wheel or capstan 16 that is located at the forward middle portion of the containing area 14 and is mounted for rotation about a vertical center axis 18, this capstan having a cylindrical drive surface 20. In the usual operation of the unit 10, the drive surface 20 engages a circular drive element positioned within the magnetic tape cartridge which in turn causes the travel of a drive ribbon that engages the tape on the two spools in the housing.

At the forward right hand portion of the containing area 14, there is a read/write head 22 mounted to a carrying structure 24. This head 22 has a rearwardly facing operating surface 26 which is adapted to come into operating engagement with the magnetic tape. The operating surface 26 is formed with two vertically aligned and laterally spaced ridges 28 which protrude a short distance outwardly from the operating surface 26. The read/write head 22 in this particular machine has up and down movement, but no forward to rear movement. In other machines, the head could be made movable between a retracted position and an operating position. In FIGS. 1 and 2, the head 22 is shown in its operating position where it extends a short distance into the containing area 12. Of the head 22 has a retracted position, the head 22 is, when retracted, positioned at a more forward location. Also, with the switch elements 32 and 34 in another position, the unit 10 could be prevented from playing entirely.

At the left side of the forward part of the containing area 14, there is a control switch mechanism 30 comprising upper and lower switch elements 32 and 34, respectively, pivotally mounted at inner ends to a switch structure 36. At the opposite ends of the switch elements 32 and 34, there are respective contact discs 38. In the normal operation of the tape drive unit 10, these switch elements 32 and 34 are selectively located by a positioning device in the magnetic tape cartridge to affect operation of the tape drive unit 10. For example, with the switch elements 32 and 34 in one position, the tape drive unit 10 could be prevented from erasing information contained on the magnetic tape.

It is to be understood that the tape drive unit 10 and its components 12–38 described above already exist in the prior art. The present invention is particularly adapted to operate in this tape drive unit 10 to clean the operating surface 26 of the read/write head 22 and to be compatible with the operational characteristics of the tape drive unit 10.

The apparatus of the present invention is in the form of a cartridge 40 comprising a housing 42 having an overall rectangular configuration generally similar to that of a tape cassette normally used with the tape drive unit 10. More specifically, this housing 42 comprises a bottom wall 44, top wall 46, front wall 48, rear wall 50 and right and left side walls 52.

In describing the present invention, the cleaning cartridge 40 will be considered as having a forward portion, a rear portion, and first and second side portions, corresponding to the locations of the front wall 48, rear wall 50, and the right and left side walls 52, respectively. Further, the cartridge 40 will be considered as having a longitudinal center axis 53 (see FIG. 1) which extends in a forward to rear direction through the center portion of the cartridge 40.

The main operating components of the cartridge 40 are a carriage 54 mounted in the housing 42 for side to side motion, a drive transmission 56 arranged to engage the capstan 16 to cause the side to side motion of the carriage 54, a cleaning device 58 mounted to the carriage 54 so as to be in cleaning engagement with the operating surface 26 of the read/write head 22, and a switch locating device 60 adapted to properly position the switch elements 32 and 34.

To describe the carriage 54 more specifically, this carriage 54 has a generally planar plate-like configuration and rests on the bottom wall 44. The carriage 54 has a left mounting end portion 62, a right cleaning end portion 64, and an intermediate drive engaging portion 66.

The left mounting portion 62 of the carriage 54 is formed with a laterally extending through slot 68 to receive an upright pivot pin 70 connected to and extending upwardly from the bottom wall 44 of the housing 42. This slot and pin connection 68–70 serves the function of locating the left mounting portion 62 of the carriage 54, and also acts as a pivot location to permit limited fore and aft movement of the right cleaning end portion 64 of the carriage 54.

At the forward end of the right end portion 64 of the carriage 54, there is a rectangularly shaped cleaning member 72 which defines a forwardly facing open recess 74 to receive therein a cleaning pad 76. The pad 76 extends a short distance beyond the forward edges of the cleaning member 72 so as to be able to come into engagement with the operating surface 26 of the read/write head 22. The forward surface of the pad 76 has its side edges slanted, as at 77, at about a 45° angle from the longitudinal axis 53, so as to enhance the cleaning action of the pad 76 against the head surface 26.

The aforementioned drive transmission 56 comprises a first drive wheel 78 positioned at the forward middle portion of the housing 42 and mounted for rotation about its vertical center axis by means of a pin 80 connected to the housing 42. Located below and fixedly connected to the drive wheel 78 is a first gear 82 of a relatively small diameter, which gear 82 meshes with a larger gear 84 positioned rearwardly of the gear 82 and centrally located in the housing 42 on the axis 53. This gear 84 is mounted to a pin 86 in the housing 42 for rotation about its vertical center axis.

The larger gear 84 is fixedly connected to a circular cam 88 that is mounted eccentrically from the center pin 86 about which the gear 84 rotates. This circular cam 88 fits within a longitudinally extending cam slot 90 formed in the plate-like portion of the carriage 54. More specifically, this cam slot 90 is defined by two longitudinally aligned side edges 92 spaced from one another by a lateral distance just slightly larger than the diameter of the circular cam 88. The forward and rear ends of the edges 92 are connected by upper and lower circular edges 94.

It is apparent from examining FIGS. 1 and 2 that as the drive wheel 78 is turned by the capstan 16, the gear 82 causes a corresponding rotation of the gear 84 to cause the cam 88 to act in the cam slot 90 to cause a side to side reciprocating motion of the carriage 54. In FIG. 1, the cam 88 is positioned so that it has moved the carriage 54 to its extreme right hand position, while in FIG. 2, the cam has rotated 180° from the position of FIG. 1 so as to move the carriage 54 to its extreme left hand position.

To urge the right end cleaning portion 64 of the carriage 54 forwardly so as to be in proper engagement with the read/write head 22, there is provided a spring member 94 which is in the form of an elongate resilient rod looped at 96 around a pin 98, and having one arm 100 engaging the right side wall 52, and a second arm 102 engaging a rear end of the U-shaped cleaning member 72. More specifically, the elongate end portion 102 of the spring 94 fits into a small rearwardly facing slot so as to permit relative slide movement between the cleaning member 72 and the spring arm 102 so as to permit the back and forth movement of the carriage 54.

Suitable stop members and locating members are provided. More specifically, the carriage 54 has two upstanding locating pins 104, the upper ends of which are positioned closely adjacent to the top wall 46. A stop pin 106 is positioned to engage the front edge of the carriage 54 and limit the forward movement of the carriage 54, and a suitable stop member (not shown for convenience of illustration) is provided to limit the rearward movement of the carriage 54.

It will be noted that at the right front corner of the housing 42 there is a hinge mounted door 108. This is provided primarily to make the cartridge 40 compatible with this particular tape drive unit 10, since the tape cassette which is normally used in the unit 10 has a similar door. However, it is possible that this door 108 could be eliminated.

With reference to FIGS. 3-9, the aforementioned switch locating device 60 will now be described. This locating device 60 is rotatably mounted in the left part of the forward portion of the housing 42. This locating device 60 is, or may be, made as a single integral piece, such as a piece of molded plastic, and it is rotatably mounted to the bottom and top walls 44 and 46 by means of a lower pin 110 and upper mounting disc 112. The upper part of the disc 112 is made with a suitable keyed recess 114 to permit the locating device 60 to be rotated to the appropriate location. The device 60 has a friction fit with the housing 42 so that it will normally remain in one of four selected positions for proper location of the switch elements 32 and 34.

The locating device 60 has a middle locating section 116 having four sets of locating surfaces generally designated 118, 120, 122 and 124, respectively, positioned around the circumference of the section 116 and spaced 90° from one another so as to be positioned in quadrants. Also, each locating surface 118-124 has an upper and lower surface portion, with the upper surface portion being designated by an "a" suffix, and the lower surface portion being designated by a "b" suffix.

Figure 8:
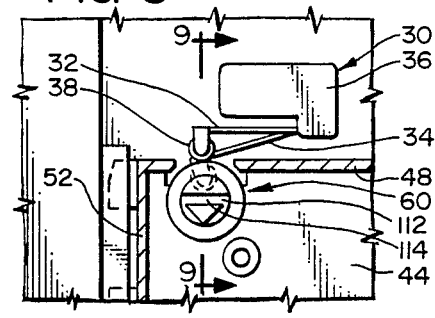
Figure 9:
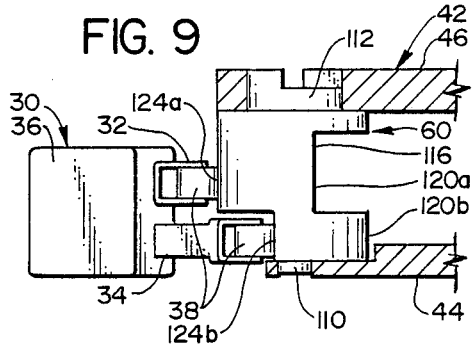

The first surface portion 118 has its upper and lower surface portions 118a and 118b positioned at a radially outward location so that the two switching elements 32 and 34 are both located at a more forward position. The second locating surface 120 has its upper surface portion 120a recessed so as to permit the upper switch element 32 to rotate rearwardly, while the lower surface portion 120b holds the lower switch element 34 forwardly. The third surface 122 has both upper and lower surface portions 122a and 122b recessed so as to permit both of the switch elements 32 and 34 to be in a more rearward position. Finally, the fourth surface 124 has the upper surface section 124a at a more radially outward position, and the lower surface portion 124b recessed to maintain the upper switch element 32 at a more forward position, and the lower switch element 34 at a more rearward position, as illustrated in FIGS. 8 and 9.

Thus, it is apparent that by rotating the switch locating device 60 to the appropriate position, any one of four combinations can be achieved in locating the switch elements 32 and 34. This insures that the cleaning cartridge 40 of the present invention can be made to be compatible with one or more selected operating modes of the tape drive unit 10 which are dependent on the location of the switch element 32 and 34. Some tape drive units 10 may be arranged so that with the switch elements 32 and 34 in a particular position, the unit 10 may not even turn on. Another possibility is that the manufacturer of certain units 10 may wish to have an internal mechanism so that the unit 10 would have a particular cleaning mode of operation, and it would be desired to have this sensed by the elements 32 and 34. The switch locating device 60 could then be arranged to be positioned so as to place the unit 10 in the specific cleaning mode.

In FIGS. 10-15 there is shown a modified version of the cleaning cartridge 40. This modified version of FIGS. 10-15 is substantially the same as the first embodiment as shown in FIGS. 1-9, except that there is provided a modified switch locating device, with this modified switch locating device being designated 126. This second version of the locating device 126 is somewhat simplified in that it provides for only two combinations of locations for the switching elements 32 and 34. In this second embodiment, the upper switching element 32 always remains in the forward position when the cleaning cartridge is positioned in the containing area 14, while the lower switch element 34 can be located either at the forward position or at the more rearward position.

To distinguish the components of the second embodiment shown in FIGS. 10-15, components which correspond to components of the first embodiment will be given like numerical designations, with a prime (') designation distinguishing those of the second embodiment. Thus, the cleaning cartridge 40' has a housing 42' with a front wall 48'. The drive wheel 78' is located at the middle forward portion of the housing 42', while the cleaning pad 76' is located at the forward right hand portion of the housing 42'.

The locating device 126 is slide mounted to the left part of the forward wall 48'. This device 126 has a lower left hand forwardly facing surface portion 128 which slides beneath an upper fixed surface portion 130 that is made integral with the forward wall 48' of the housing 42'. The fixed surface portion 130 is positioned so as to always engage the upper switch element 32 when the cartridge is mounted in its operating position, so as to hold the switch element 32 in its more forward location. A recess can be provided at 131 to position a third switch in a desired location, in the event such a third switch is present in the machine.

On the other hand, the lower surface portion 128 is selectively operated, this being accomplished by manually engaging the locating device 126 and moving it either to the right hand position as shown in FIGS. 10-12, or to the left hand position as shown in FIGS. 13-15. The device 126 has a manipulating portion 132 with several serrations or indentations 134 to permit the device 126 to be engaged by a person's finger, the person's fingernail, or possibly a small tool. As indicated above, by sliding the device 126 to either the left or right, the position of the lower switch element 34 can be determined.

To describe the overall operation of the present invention, reference will first be made to the first embodiment shown in FIGS. 1-9. First, the locating device 60 is rotated to the appropriate position so that this device 60 will properly locate the switching elements 32 and 34 so as to be compatible with the prescribed cleaning mode of operation of the tape drive unit 10.

Then the cleaning cartridge 40 is inserted into the operating area 14 of the tape drive unit 10, this being accomplished in generally the same manner as a conventional magnetic tape cassette is inserted into the unit 10. Then the tape drive unit 10 has its operating knob, button or lever manipulated to cause the unit 10 to operate. In this particular unit 10, the operation is such that the capstan or drive wheel 16 will rotate at a relatively rapid rate of rotation intermittently in one direction or the other.

As the capstan 16 rotates, it acts through the drive wheel 78 and the two gears 82 and 84 to cause rotation of the cam 88 that is fixedly mounted eccentrically to the gear 84. It is apparent that the gears 82 and 84 provide a speed reducing transmission so that the rotation of the cam 88 is a fraction of the speed of rotation of the capstan 16. The rotation of the cam 88 causes the reciprocating motion of the carriage 54 in the manner described above.

When the tape drive unit 10 is operated, the read/write head 22 of this particular machine is moved by the unit 10 upwardly and downwardly in the position as shown in FIGS. 1 and 2. In this position, the operating surface 26 of the head 22 comes into engagement with the forward cleaning surface of the pad 76.

When the rotation of the capstan 16 causes the back and forth motion of the carriage 54, the pad 76 wipes in a back and forth motion over the surface 26 of the head 22. The spring member 94 urges the cleaning member 72 forwardly with a moderate force so that there is the proper frictional engagement between the cleaning pad 76 and the surface 26.

With regard to the wiping action of the pad 76, it will be noted that because of the pivot mounting about the pin 70, the right end portion 64 of the carriage 54 (and hence the pad 76) is permitted to have limited forward and rearward movement. It will also be noted that this forward and rearward movement of the pad 76 is a pivot movement about a pivot location which is adjacent to the left portion of the carriage 54 (i.e. at the location of the pin 70) at a more forward location. Thus, it will be noted that the carriage 54 is in effect a very long lever arm, extending from the pad 76 all the way to the location of the pin 70. This causes any forward and aft movement of the pad 76 to be nearly linear relative to the surface 26. Further, it will be noted that the location of the pin 70 is at a more forward location so that the fore and aft movement of the pad 76 is nearly perpendicular to the surface 26 of the head 22.

It has been found that this particular arrangement of the carriage with the cleaning member 72 and pad 76, along with the spring member 94, permits adequate frictional engagement between the pad 76 and the head surface 26 for proper cleaning action, but that the ridges 28 formed on the surface 26 do not exert a resisting force on the pad 76 sufficient to trigger a shutoff mechanism in the tape drive unit 10.

Further, it will be noted that in the position of FIG. 1, the pad 76 is located so that it is a very short distance to the right of the right ridge 28. It will further be noted that as the cam 88 begins to rotate from the position of FIG. 1 to bring the pad 76 to the location of the right ridge 28, the cam 88 is positioned so that it still has a relatively high mechanical advantage as it bears against the left edge 92 of the cam slot 90. Thus, the pad 76 is better able to be deflected a short distance outwardly from the ridge 28 without exerting excessive force back through the carriage 54 to the cam 88 to trigger the shutoff mechanism. A similar situation exists when the carriage 54 and the pad 76 are in the full left hand position as shown in FIG. 2.

Normally a cleaning solution is applied to the pad 76, and this pad 76 can be replaced periodically.

As indicated previously, the operation of the switch locating device 60 of the first embodiment and also of the corresponding locating device 126 of the second embodiment is such as to locate the upper and lower switch elements 23 and 34 so that the unit 10 can properly function.

It is to be understood that various modifications can be made without departing from the teachings of the present invention.

I claim:

1. An apparatus to perform a cleaning operation on a machine which receives data from and/or imparts data to a magnetic tape, where the machine comprises:
   a. a structure defining an operating location to receive a tape cassette, said operating location having a front area, a rear area and first and second side areas;
   b. a read and/or write head located at the front area adjacent said first side area, with the head having a rearwardly facing surface requiring periodic cleaning, positioned to operatively engage a magnetic tape in the tape cassette;
c. a drive system to engage a drive element in the tape cassette to move the magnetic tape by the head;

said apparatus comprising:
   a. a housing having a configuration to fit within said operating location in an operating position, said housing having a forward portion, a rear portion, first and second side portions, a center portion, and a longitudinal center axis extending from the front portion, through the center portion to the rear portion;
   b. a carriage positioned in the housing and having first and second end portions adjacent said first and second side portions of the housing, respectively, said second end portion being pivotally mounted to mounting means at a mounting location at the second side portion in the housing for pivot motion about said mounting location, and also for back and forth motion in said housing relative to the mounting location along a lateral path having a substantial alignment component perpendicular to said longitudinal center axis;
   c. said carriage having at its first end portion a cleaning portion at a cleaning location, which cleaning portion is adapted to carry a cleaning member and which, with the housing in the operating position, is adjacent to the head of the machine, said cleaning portion and the second end portion of the carriage being positioned, relative to said mounting location, for limited movement along a forward and rearward path about said mounting location as a pivot location, with the carriage acting as a lever arm extending from said mounting location transversely across said longitudinal center line to said cleaning location;
   d. drive means positioned to operatively engage said drive system so as to be driven thereby, to move said carriage from side to side along said lateral path so that said cleaning portion moves along a substantially linear side to side cleaning path relative to said head;
whereby with the housing in said operating position, the cleaning portion, being movable along said forward and rearward path, is able to be in proper engagement with said head, as it is moved back and forth across said head when in cleaning engagement therewith.

2. The apparatus as recited in claim 1, further comprising spring means operatively engaging the cleaning portion of the carriage to urge the first end portion of the carriage forwardly so as to place the cleaning portion in operative cleaning engagement with the head.

3. The apparatus as recited in claim 1, wherein:
   a. said drive means comprises a first drive wheel positioned at the forward portion of the housing to engage the drive system of the machine, with said drive wheel being in turn connected to a speed reducing gear transmission, a cam member mounted eccentrically to said speed reducing gear transmission, said carriage having a cam follower means engaging said cam in a manner that rotational movement of said cam causes reciprocating movement of said carriage;
   b. said mounting means comprises a pin and slot mounting means, where one of said carriage and said housing has a pivot pin, and the other of said carriage and housing has an elongate horizontal slot engaging said pin;
   c. spring means operatively engaging the cleaning portion of the carriage to urge the first end portion of the carriage forwardly so as to place the cleaning portion in operative cleaning engagement with the head.

4. The aparatus as recited in claim 3, wherein:
   a. said speed reducing gear transmission comprises at least a first gear operatively connected to said drive wheel and a second larger gear operatively connected to said cam;
   b. said carriage is formed with said laterally extending slot, and said pin is mounted to said housing;
   c. said pivot pin is mounted, relative to said cleaning member, at a forward location adjacent to the second side portion of the housing, so that forward to rear movement of said cleaning member about said mounting location is substantially perpendicular to the operating surface of the read and/or write head.

5. The apparatus as recited in claim 1, wherein said drive means comprises first drive element means mounted for rotation at the center portion of the housing, and second drive element means operatively connected between said first drive element means and said carriage to translate rotational movement of said first drive element means to back and forth motion that is imparted to said carriage.

6. The apparatus as recited in claim 5, wherein said first drive element means comprises a cam member having a cam surface, with the cam member being mounted eccentrically for rotation relative to said cam surface, and said second drive element means comprises a cam follower operatively engaging said cam surface.

7. The apparatus as recited in claim 1, wherein said drive means comprises a first drive wheel positioned at the forward portion of the housing to engage the drive system of the machine, with said drive wheel being in turn connected to a speed reducing gear transmission, a cam member mounted eccentrically to said speed reducing gear transmission, said carriage having a cam follower means engaging said cam in a manner that rotational movement of said cam causes reciprocating movement of said carriage.

8. The apparatus as recited in claim 7, wherein said speed reducing gear transmission comprises at least a first gear operatively connected to said drive wheel and a second larger gear operatively connected to said cam.

9. The apparatus as recited in claim 1, wherein said mounting means comprises a pin and slot mounting means, where one of said carriage and said housing has a pivot pin, and the other of said carriage and housing has an elongate horizontal slot engaging said pin.

10. The apparatus as recited in claim 9, wherein said carriage is formed with said laterally extending slot, and said pin is mounted to said housing.

11. The apparatus as recited in claim 9, wherein said pivot pin is mounted, relative to said cleaning member, at a forward location adjacent to the second side portion of the housing, so that forward to rear movement of said cleaning member about said mounting location is substantially perpendicular to the operating surface of the read and/or write head.

12. The apparatus as recited in claim 1, wherein the machine has contact switch means positioned to engage contact members of a magnetic tape cassette so as to be located in selected switch positions relating to operation of said machine, and said apparatus comprises a selectively operable switch locating device, said switch locating device being movable between at least first and second positions to locate the switch means of the machine selectively at at least two selected positions.

13. The apparatus as recited in claim 12, wherein said switch means comprises at least first and second switch elements, and said switch locating device comprises first and second contact surface means, at least one of which is arranged for selective engagement with at least one of said switch elements.

14. The apparatus as recited in claim 13, wherein said switch locating device comprises a plurality of contact surfaces, with said locating device being rotatably mounted so as to place selectively said contact surfaces into selected contact with the switch elements.

15. The apparatus as recited in claim 13, wherein said locating device is mounted for linear motion relative to said housing, and said locating device has at least one contact surface which is movable with said locating device to a contact location with at least one of said switch elements, and also movable to a noncontact location.

* * * * *